(12) United States Patent
Eriksson et al.

(10) Patent No.: US 10,080,071 B2
(45) Date of Patent: Sep. 18, 2018

(54) CONTROLLING TIME DIVISION DUPLEX OPERATION (71) Applicant: TELEFONAKTIEBOLAGET LM ERICSSON (PUBL), Stockholm (SE)

(72) Inventors: Per-Erik Eriksson, Stockholm (SE); Miguel Berg, Upplands Väsby (SE); Chenguang Lu, Sollentuna (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/303,238

(22) PCT Filed: Apr. 11, 2014

(86) PCT No.: PCT/SE2014/050449
§ 371 (c)(1),
(2) Date: Oct. 11, 2016

(87) PCT Pub. No.: WO2015/156718
PCT Pub. Date: Oct. 15, 2015

(65) Prior Publication Data
US 2017/0034604 A1 Feb. 2, 2017

(51) Int. Cl.
H04B 10/00 (2013.01)
H04Q 11/00 (2006.01)
(Continued)

(52) U.S. Cl.
CPC ........... *H04Q 11/0005* (2013.01); *H04L 5/14* (2013.01); *H04Q 11/04* (2013.01);
(Continued)

(58) Field of Classification Search
CPC ........ H04L 5/14; H04Q 11/005; H04Q 11/04; H04Q 2011/003; H04Q 2213/098;
(Continued)

(56) References Cited

U.S. PATENT DOCUMENTS 5,832,022 A * 11/1998 Scott .................... H04L 27/201
375/142
6,771,773 B1 * 8/2004 Hanrieder ................ H04Q 3/62
379/106.08
(Continued)

FOREIGN PATENT DOCUMENTS

EP 1389029 A1 2/2004
WO 2012159853 A1 11/2012

OTHER PUBLICATIONS

3GPP TR 36.828 V11.0.0, 3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11), Jun. 2012.
(Continued)

*Primary Examiner* — Amritbir Sandhu (57) ABSTRACT

A central node for digital subscriber line access multiplex. The central node supports a plurality of subscriber devices and comprises: a digital interface for upstream communication; a converter device for each one of the subscriber devices wherein each converter device comprises an A/D, analogue to digital, converter and a D/A, digital to analogue, converter; an analogue optical interface for communication of analogue signals for all of the subscriber devices with an intermediate distribution node for digital subscriber line access multiplex; a digital multiplexer/demultiplexer connected between the digital interface and the plurality converter devices; an analogue multiplexer/demultiplexer connected between the analogue optical interface and the plurality of converter devices; and a control signal generator connected to the analogue multiplexer/demultiplexer, wherein the control signal generator is arranged to generate
(Continued)

an analogue control signal for controlling time division duplex operation at the intermediate distribution node.

24 Claims, 4 Drawing Sheets

(51) Int. Cl.
    *H04Q 11/04*     (2006.01)
    *H04W 52/24*     (2009.01)
    *H04L 5/14*     (2006.01)

(52) U.S. Cl.
    CPC .. *H04W 52/244* (2013.01); *H04Q 2011/0033* (2013.01); *H04Q 2213/098* (2013.01); *H04Q 2213/292* (2013.01)

(58) Field of Classification Search
    CPC ......... H04Q 2213/292; H04Q 11/0005; H04Q 2011/0033; H04W 52/244
    USPC ..................................................... 398/41, 42
    See application file for complete search history.

(56) References Cited

U.S. PATENT DOCUMENTS

| | | | |
|---|---|---|---|
| 2002/0135844 A1 | 9/2002 | Silberman et al. | |
| 2004/0146072 A1* | 7/2004 | Farmwald | H04L 12/2856 370/537 |
| 2005/0266849 A1* | 12/2005 | Li | H04W 8/005 455/436 |
| 2006/0023756 A1* | 2/2006 | Meier | H04L 12/2801 370/537 |
| 2007/0264934 A1* | 11/2007 | Holder | H04B 1/18 455/13.3 |
| 2008/0279123 A1* | 11/2008 | Struhsaker | H01Q 1/246 370/280 |
| 2013/0315595 A1* | 11/2013 | Barr | H04J 14/08 398/67 |
| 2014/0010270 A1* | 1/2014 | Shi | H04M 11/062 375/222 |
| 2014/0161000 A1* | 6/2014 | Fazlollahi | H04B 3/32 370/280 |
| 2014/0269245 A1* | 9/2014 | Eriksson | H04J 3/10 370/201 |
| 2015/0215059 A1* | 7/2015 | Kerpez | H04M 11/062 379/406.01 |
| 2015/0266849 A1* | 9/2015 | Paetz | C07D 319/12 549/274 |
| 2015/0349938 A1* | 12/2015 | Trojer | H04L 5/0064 370/281 |
| 2017/0117960 A1* | 4/2017 | Peng | H04B 10/07953 |

OTHER PUBLICATIONS

Huawei, Relay frame structure design of TDD mode, 3GPP TSG RAN WG1 Meeting #56bis, R1-091270, Seoul, Korea, Mar. 23-27, 2009.

* cited by examiner

CONTROLLING TIME DIVISION DUPLEX OPERATION

This application is a 371 of International Application No. PCT/SE2014/050449, filed Apr. 11, 2014, the disclosure of which is fully incorporated herein by reference.

TECHNICAL FIELD

The invention relates to a central node, an intermediate distribution node and methods for controlling time division duplex operation.

BACKGROUND

Digital Subscriber Line (DSL) technology has improved Internet access for many subscribers by transmitting digital data over pre-existing telephone wires. In this way, no new cables are needed to be provided to each individual subscriber. DSL technologies include ADSL (Asymmetric DSL), VDSL (Very high bitrate DSL), HDSL (High bitrate DSL), SDSL (Symmetric DSL), etc., collectively denoted xDSL.

In the field of fiber to distribution point (FTTDp), DSLAM (DSL Access Multiplexer) relates to the network device or devices installed upstream from the subscriber, often in telephone exchanges, which converts between DSL signals (to/from the subscriber) and a data network interface.

US 2002/0135844 discloses a system and method for extending the distance that xDSL services are able to be provided to subscribers. A DSLAM located at a Central Office is connected to a general-purpose network, such as the Internet. The DSLAM is additionally connected to a first fiber optic transceiver. The first fiber optic transceiver is connected via a fiber optic link to a second fiber optic transceiver located proximate to the subscribers' premises, preferably in a street cabinet. Each subscriber premise's equipment is connected to the broadband transceiver via subscriber lines. Electrical signals to be transmitted between the Central Office and the subscribers' premises are utilized to form a frequency division multiplexed signal. At the respective receiving transceiver, the frequency division multiplexed signal is reconverted to the electrical signals, which are then applied to the subscriber premises equipment or DSLAM, depending upon the direction of communication.

However, the DSLAM technology of the prior art does not support developing DSL standards, such as those related to G.fast developed by ITU-T (International Telecommunication Union Telecommunication Standardization Sector), which requires TDD (Time Division Duplex).

SUMMARY

It is an object to provide DSLAM technology which allows an efficient control of TDD operation.

According to a first aspect, it is presented a central node for digital subscriber line access multiplex. The central node supports a plurality of subscriber devices and comprises: a digital interface for upstream communication; a converter device for each one of the subscriber devices wherein each converter device comprises an A/D, analogue to digital, converter and a D/A, digital to analogue, converter; an analogue optical interface for communication of analogue signals for all of the subscriber devices with an intermediate distribution node for digital subscriber line access multiplex; a digital multiplexer/demultiplexer connected between the digital interface and the plurality converter devices; an analogue multiplexer/demultiplexer connected between the analogue optical interface and the plurality of converter devices; and a control signal generator connected to the analogue multiplexer/demultiplexer, wherein the control signal generator is arranged to generate an analogue control signal for controlling time division duplex operation at the intermediate distribution node. In this way, TDD in the intermediate distribution node can be controlled from the central node. Moreover, by using the analogue control signal, no digital components are required at the intermediate distribution node.

The analogue multiplexer/demultiplexer may be arranged to utilize frequency division multiplex over the analogue optical interface. Using FDM, latency over the optical interface is low, e.g. compared to TDM (Time Division Multiplex).

The control signal generator may be arranged to control the time division duplex operation at the intermediate distribution node using amplitude modulation of the analogue control signal.

The control signal generator may be arranged to control the time division duplex operation at the intermediate distribution node by selectively providing essentially zero amplitude or a preconfigured non-zero amplitude of the analogue control signal.

The essentially zero amplitude may indicate a receiving time slot and the preconfigured non-zero amplitude indicates a transmission time slot.

The control signal generator may further be arranged to proportionally control the gain of a power amplifier at the intermediate distribution node using the amplitude of the analogue control signal. In this way, the power for the transmission of the intermediate distribution node can be effectively controlled by the central node.

The control signal generator may further be arranged to generate a frequency reference signal. This reduces any inaccuracies of a local oscillator at the intermediate distribution node.

According to a second aspect, it is presented an intermediate distribution node for digital subscriber line access multiplex. The intermediate distribution node supports a plurality of subscriber devices and comprises: an analogue optical interface for communication of analogue signals for all of the subscriber devices with a central node for digital subscriber line access multiplex; a subscriber interface for an electrical subscriber line connection to each one of the subscriber devices; an analogue demultiplexer/multiplexer connected between the analogue optical interface and the subscriber interfaces; and a switch for each one of the subscriber devices, wherein the switch is controllable to selectively enable reception and/or transmission over the respective subscriber interface, controlled using an analogue control signal received from the central node.

The intermediate distribution node may further comprise a transmission amplifier, the gain of which is proportionally controlled using the analogue control signal.

The intermediate distribution node may further comprise a mixer, and a local oscillator wherein the frequency of the local oscillator depends on a frequency reference signal of the analogue control signal.

According to a third aspect, it is presented a method for controlling an intermediate distribution node for digital subscriber line access multiplex. The method is performed in a central node for digital subscriber line access multiplex supporting a plurality of subscriber devices and comprises the steps of: converting incoming digital signals to analogue signals in a plurality of converter devices, for each one of a plurality of subscriber devices wherein each converter device comprises an A/D, analogue to digital, converter and a D/A, digital to analogue, converter; generating an analogue control signal for controlling time division duplex operation at the intermediate distribution node; multiplexing the analogue downstream signals and the analogue control signal to a combined analogue signal; and transmitting the combined analogue signal to the intermediate distribution node over an analogue optical interface.

The step of multiplexing may comprise multiplexing using frequency division multiplex.

The step of generating an analogue control signal may comprise using amplitude modulation of the analogue control signal to control the time division duplex operation at the intermediate distribution node.

The step of generating an analogue control signal may comprise selectively providing essentially zero amplitude or a preconfigured non-zero amplitude of the analogue control signal to control the time division duplex operation at the intermediate distribution node.

The step of generating an analogue signal may comprise proportionally controlling the gain of a power amplifier at the intermediate distribution node using the amplitude of the analogue control signal.

The step of generating an analogue control signal may comprise generating a frequency reference signal.

According to a fourth aspect, it is presented a method, performed in an intermediate distribution node for digital subscriber line access multiplex. The method comprises the steps of: receiving an analogue control signal from a central node for digital subscriber line access multiplex using an analogue optical interface for communication of analogue signals for all of the subscriber devices with the central node; and controlling, for each one of the subscriber devices, the state of a switch, to selectively enable reception and/or transmission over a respective subscriber interface, based on the analogue control signal.

The method may further comprise the step of: controlling, for each one of the subscriber devices, a gain of a transmission amplifier, in proportion to an amplitude of the analogue control signal.

Whenever used herein, the term switch is to be construed as any element which is controllable to be in a conducting or blocking state. The switch can also have other purposes, such as amplification, etc.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
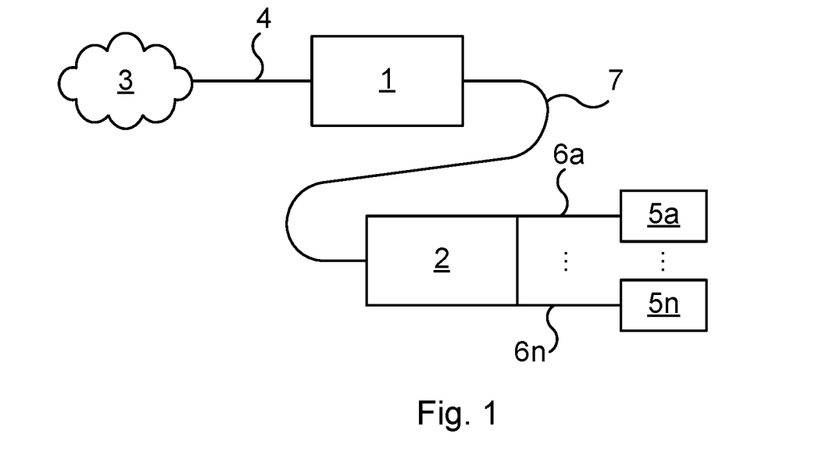
FIG. 1 is a schematic diagram illustrating an environment in which embodiments presented herein can be applied.

FIG. 1 is a schematic diagram illustrating an environment in which embodiments presented herein can be applied.

A central node 1, also known as a DSLAM central unit, is connected via an optical fibre 7 to an intermediate distribution node 2, also known as a DSLAM remote unit. The central node is connected via a data connection 4 to a data network 3, indirectly or directly connected to a wide are network such as the Internet. The signals for the subscribers over the optical fibre 7 are analogue, whereby the central node 1 converts between digital signals, for the data connection, and analogue signals, for the optical fibre 7. The signals on the optical fibre are provided on different frequency bands for each subscriber, i.e. utilising Frequency Division Multiplexing (FDM). Compared to Time Division Multiplex (TDM), FDM has the advantage of lower latency, since the signal for all subscribers can be transferred concurrently. Typically, there are many instances of co-located central nodes 1, each corresponding to an intermediate distribution node 2.

The intermediate distribution node 2 is connected via the optical fibre 7 to the central node 1 on one end and, via a number of subscriber lines 6a-n, a plurality of subscriber devices 5a-n on the other end. The intermediate distribution node 2 converts between the analogue FDM signals on the optical fibre 7 and individual electrical signals on the individual subscriber lines 6a-n. The intermediate distribution node 2 can e.g. be located in a street-side cabinet. In an xDSL network, there are many intermediate distribution nodes 2. Optionally, the intermediate distribution node 2 is power by the subscriber devices 5a-n via the subscriber lines 6a-n.

Each one of the subscriber lines 6a-n is an electrical connection and can e.g. be copper cables originally installed for telephony. Each one of the subscriber devices 5a-n is located in respective subscriber premises and converts between xDSL signals and data network signals, e.g. complying with any one of the Ethernet standards and/or WiFi (any one of the IEEE 802.11x standards). The subscriber device is also known as customer-premises equipment (CPE), xDSL modem, xDSL gateway, etc.

In the depicted system, downstream is the direction towards the subscriber device 5a-n and upstream is the direction from the subscriber device 5a-n.

As described in more detail below, the central node 1 also controls how TDD is performed in the intermediate distribution node 2, using analogue control signals over the optical fibre 7. In TDD, there are reception time slots when there is only reception and transmission time slots when there is only transmission.

Figure 2:
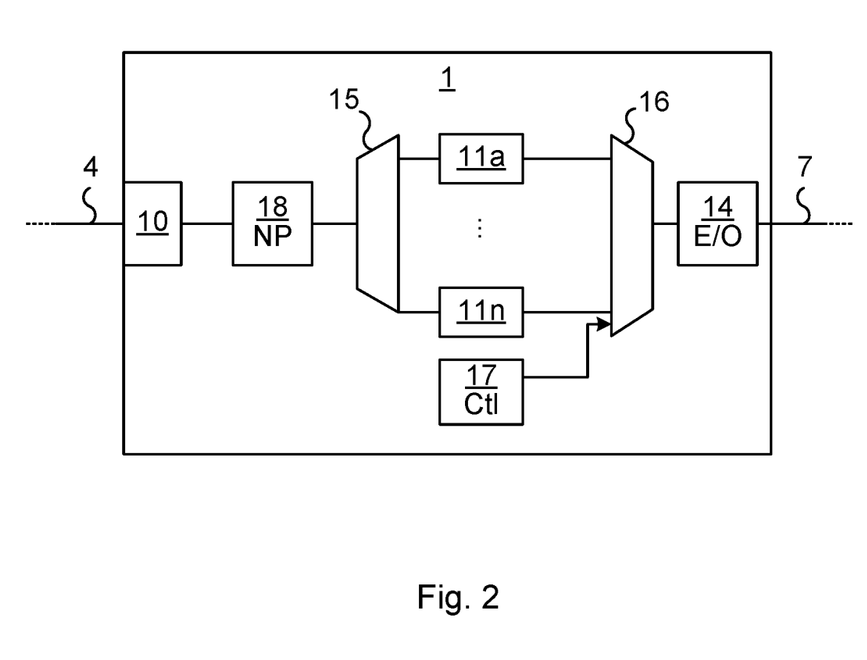
FIG. 2 is a schematic diagram illustrating the central node of FIG. 1 according to one embodiment.

FIG. 2 is a schematic diagram illustrating the central node 1 of FIG. 1 according to one embodiment. As described above, the central node 1 is used for DSLAM.

A digital interface 10 supports upstream communication over the data connection 4. For instance, the digital interface 10 can support any one or more of the following: GPON (Gigabit-capable Passive Optical Network), Fiber P2P (physical to physical), GBE (Gigabit Ethernet), 10 GBE (10 Gigabit Ethernet), WDMPON (Wavelength Division Multiplexing Passive Optical Network), etc. The digital interface 10 is connected to a network processor 18 which is used for traffic control.

A digital multiplexer/demultiplexer 15 is connected between the digital interface 10 (via the network processor 18) and a plurality of converter devices 11a-n. The digital multiplexer/demultiplexer 15 demultiplexes digital signals from the digital interface 10 (via the network processor 18) to digital signals to each one of the converter devices 11a-n. Moreover, the digital multiplexer/demultiplexer 15 multiplexes digital signals from each one of the converter devices 11a-n to the digital interface 10 (via the network processor 18). The converter devices 11a-n are described in more detail below with reference to FIG. 3.

A control signal generator 17 generates an analogue control signal for the TDD operation of the intermediate distribution node 2. In this way, the TDD operation can be correctly controlled without the need of any carefully synchronised clocks between the central node 1 and the intermediate distribution node 2. Moreover, the analogue signal requires no demodulation at the intermediate distribution node 2, reducing complexity and latency. The format of the analogue control signal is described in more detail below.

An analogue multiplexer/demultiplexer 16 is connected between the plurality of converter devices 11a-n and an analogue optical interface 14. Moreover, the control signal generator 17 is connected to the analogue multiplexer/demultiplexer.

The analogue interface 14 converts between electrical signals to/from the analogue multiplexer/demultiplexer 16 and optical signals of the optical fibre.

Figure 3:
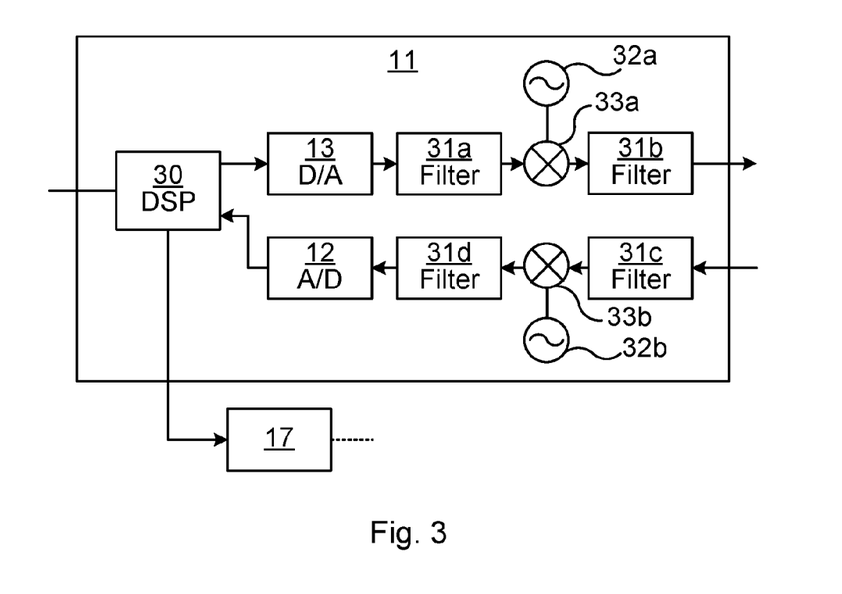
FIG. 3 is a schematic diagram illustrating any one of the converter devices of FIG. 2 according to one embodiment.

FIG. 3 is a schematic diagram illustrating any one of the converter devices 11a-n of FIG. 2 according to one embodiment, here represented by a single converter device 11. A DSP (Digital Signal Processor) 30 performs tasks such as framing/deframing, coding/decoding, QAM-modulation/demodulation, equalizing, FFT (Fast Fourier Transform)/IFFT (Inverse Fast Fourier Transform), etc.

In the downstream (towards the subscriber device), a digital to analogue (D/A) converter 13 converts downstream digital signals to downstream analogue signals. Optionally, a first downstream filter 31a is placed between the D/A converter and a downstream mixer 33a. A downstream local oscillator 32a provides a signal of a predetermined frequency to the downstream mixer 33a, to place the downstream analogue signals in a predetermined frequency band. Different converter devices 11a-n have different frequencies on their downstream local oscillators 32a, whereby the downstream analogue signals of each converter device is in its own frequency band, thus providing the FDM in the downstream. A second downstream filter 31b filters out any unwanted signals outside the assigned frequency band and provides an output electrical downstream signal to the analogue multiplexer/demultiplexer.

In the upstream (from the subscriber device), an electrical signal from the analogue multiplexer/demultiplexer is provided to a first upstream filter 31c, to filter out signals intended for other converter devices. An upstream local oscillator 32b provides a signal of a predetermined frequency to an upstream mixer 33b. The predetermined frequency corresponds to the frequency band of the upstream FDM signal assigned for the converter device in question. Unwanted signals may then be filtered out using a second upstream filter 31d and an analogue to digital (A/D) converter 12 converts the upstream analogue signals to upstream digital signals to the DSP 30.

The DSP 30 of each converter device may also be connected to the control signal generator 17. In this way, the control signal generator 17 can use input from the DSP e.g. for determining an appropriate length of time slot and guard band in the TDD operation. Furthermore, the control signal generator 17 can in this way generate a control signal based on an envelope of the transmitted data signal, to thereby control the power feed to of a line driver of the intermediate distribution node (as described also below). In one embodiment, the transmission signals are used for periodic determination of a control signal controlling the power feed to a line driver of the intermediate distribution node. The input from the determination of control signal power feed does not need to come from the DSP, but can come from any source based on transmission signals, e.g. from a micro-controller.

Figure 4:
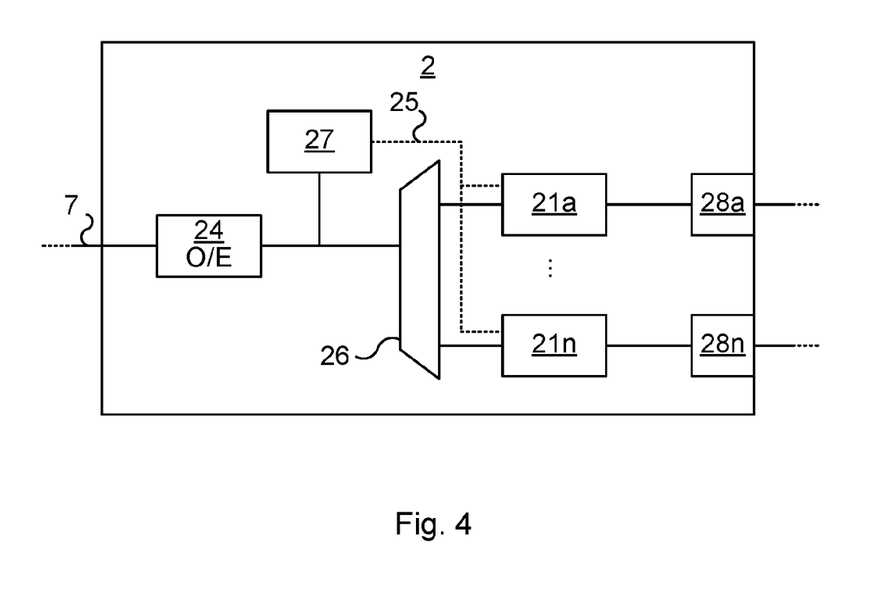
FIG. 4 is a schematic diagram illustrating the intermediate distribution node of FIG. 1 according to one embodiment.

FIG. 4 is a schematic diagram illustrating the intermediate distribution node 2 of FIG. 1 according to one embodiment. As described above, the intermediate distribution node 2 is used for DSLAM.

An analogue optical interface 24 is connected to the optical fibre for communication with a central node as described above. The analogue optical interface 24 converts between analogue optical of the optical fibre and electrical signals.

An analogue demultiplexer/multiplexer 26 is connected between the analogue optical interface 24 and subscriber interfaces 28a-n via a plurality of respective line devices 21a-n.

Each one of the subscriber interfaces 28a-n is provided for an electrical subscriber line connection to each one of the subscriber devices (see 5a-n of FIG. 1).

A control signal interface 27 is also connected to the analogue optical interface 24, and can filter out the analogue control signal originating from the control signal generator 17 of FIG. 3. The control signal interface 27 then provides appropriate control signals 25 to each one of the line devices 21a-n, e.g. to control TDD operation, as is described in more detail below.

The control signal interface 27 can be, but does not need to be, completely analogue and can comprise a filter to pass through the analogue control signal and a mixer with a local oscillator to downconvert the control signal to an appropriate frequency band, such as a baseband.

Figure 5:
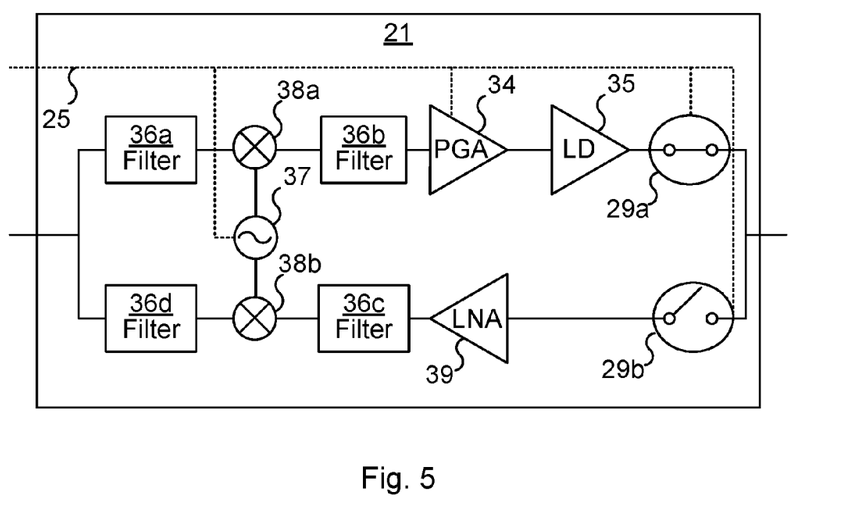
FIG. 5 is a schematic diagram illustrating any one of line devices of the intermediate distribution node of FIG. 4 according to one embodiment.

FIG. 5 is a schematic diagram illustrating any one of the line devices 21a-n of the intermediate distribution node of FIG. 4 according to one embodiment, here represented by a single line device 21.

In the downstream, an electrical signal from the analogue multiplexer/demultiplexer 26 is provided to a first downstream filter 36a, to filter out signals intended for other line devices. A local oscillator 37 provides a signal of a predetermined frequency to a downstream mixer 38a. The predetermined frequency corresponds to the frequency band of the downstream FDM signal assigned for the line device in question. Unwanted signals may then be filtered out using a second downstream filter 36b. A programmable gain amplifier 34 provides a gain according to instructions and a line driver 35 amplifies the signal to an appropriate level for distribution to the subscriber device. A downstream switch 29a can be provided to assist in the TDD operation.

In the upstream there can be a second switch 29b to assist in the TDD operation. A low noise amplifier 39 amplifies the electrical signal from the subscriber device to an appropriate level. A first upstream filter 36c filters out signals of signals at unwanted frequencies. The local oscillator 37 provides a signal of a predetermined frequency to the upstream mixer 38b, to place the upstream analogue signals in a predetermined frequency band. Different line devices have different frequencies on their local oscillators, whereby the upstream analogue signals of each line device is in its own frequency band, thus providing the upstream FDM. A second upstream filter 36d filters out any unwanted signals outside the assigned frequency band and provides an output electrical upstream signal to the analogue multiplexer/demultiplexer.

The switches 29a-b are controllable to selectively enable reception and/or transmission over the respective subscriber interface, controlled by the control signal 25 which originates from the central node.

Also, the control signal 25 can be used to control a frequency of the local oscillator 37, reducing inaccuracies in the local oscillator. The frequency reference of the control signal 25 can be a separate signal from TDD control signal or it can be combined, e.g. using a frequency of the control signals during on periods of the control signal.

Moreover, the analogue control signal can be used to perform diagnostics tests of the intermediate distribution unit, like loop-back test, delay measurements and also tests of the subscriber line.

It is to be noted that the switches 29a-b can be, but do not need to be, separate physical switches. In one embodiment, the functionality of the downstream switch 29a is implemented using the line driver 35. Alternatively or additionally, the functionality of the upstream switch 29b can be implemented using the low noise amplifier 39a.

Figure 6:
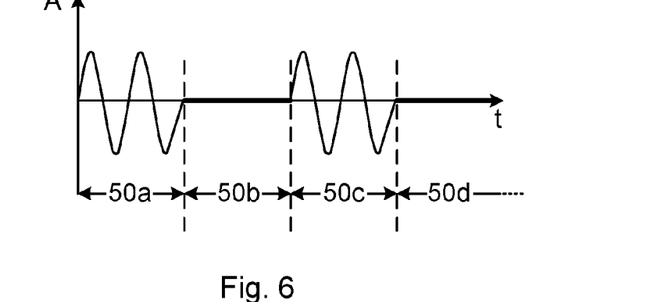
FIG. 6 is a schematic graph illustrating an analogue control signal for controlling time division duplex at the intermediate distribution node according to one embodiment.

FIG. 6 is a schematic graph illustrating an analogue control signal for controlling time division duplex at the intermediate distribution node according to one embodiment using amplitude modulation. The control signal is shown in baseband. In a first time period 50a, a section of the control signal (sinusoidal in this example, but it could be of any suitable shape) of a certain amplitude is provided. In a second time period sob, the amplitude of the control signal is essentially zero (blank). A third time period 50c corresponds to the first time period 50a, whereby the control signal is again provided with the certain amplitude, followed by a fourth time period 50d where the control signal is again blank. The first and third time period are called on periods and the second and fourth time periods are called off periods.

With the provided control signal, TDD operation can be controlled. For example, the on periods can be transmission time slots and the off periods can be reception time slots (or vice versa). Referring also to FIG. 5, if the control signal is provided to the PGA 34, the on periods will activate the PGA, providing a (downstream) transmission time slot over the subscriber line. Conversely, the off periods will deactivate the PGA, whereby no (downstream) transmission is provided over the subscriber line. Hence, the line device 21 can receive data in the off periods.

Alternatively or additionally, the control signal is provided to the downstream switch 29a and/or the upstream switch 29b, optionally via a capacitor or similar to provide a suitable positive (or negative) voltage to the switches 29a-b. The two switches 29a-b are configured such that, for transmission time slots, the downstream switch 29a is conducting and the upstream switch is blocking. Conversely, during reception time slots, the downstream switch 29a is blocking and the upstream switch 29b is conducting. When loopback testing is performed, both switches 29a-b are controlled to be in a conducting state.

It is to be noted that there can be a greater granularity within one transmission time slot (as defined by the currently used TDD scheme); the transmission from each line driver 35 can be controlled in smaller time periods than the transmission time slot, e.g. due to low power operation.

In one embodiment, the same control signal for TDD operation is provided from the control signal generator of the central node to all line devices of the intermediate distribution node.

In one embodiment, the control signal generator of the central node provides individual control signals TDD operation to each one of the line devices of the intermediate distribution node.

For certain types of line driver 35, it can be useful to provide an envelope of the transmitted data signal to control the power feed to the line driver 35, which results in a power efficient control of the line driver 35. This can be controlled using a separate envelope control signal, which e.g. can be amplitude modulated with the envelope of the signal after the D/A-converter in the central node. This envelope control signal is then demodulated in the intermediate distribution node, and controls a DC power to the line driver 35. This function could also completely reside in the intermediate distribution node, whereby the envelope of the data signal to be transmitted is extracted and used for control of the DC power to the line driver.

Figure 7:
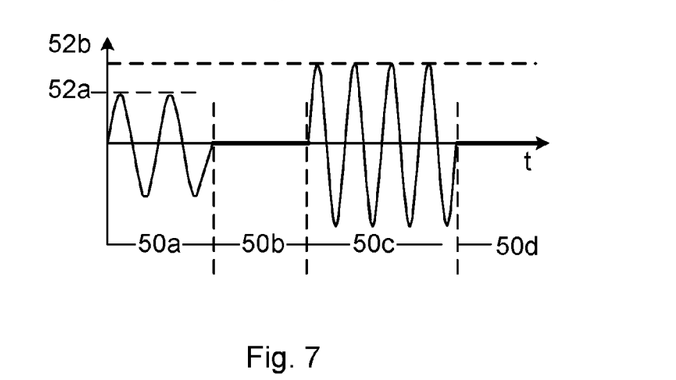
FIG. 7 is a schematic graph illustrating an analogue control signal for controlling time division duplex at the intermediate distribution node according to one embodiment also comprising gain control.

FIG. 7 is a schematic graph illustrating an analogue control signal for controlling time division duplex at the intermediate distribution node according to one embodiment also comprising gain control.

In this embodiment, in the first period 50a, the control signal is of a first, lower amplitude 52a, and in the third period 50c the control signal is of third, higher amplitude 52b. When the control signal is connected to the PGA (or other controllable downstream amplifier), this allows the control signal generator of the central node to dynamically control the gain of the downstream transmissions from the intermediate distribution node. In this way, the transmission from the intermediate distribution node from each line device can be proportionally controlled by the central node without the need for digital processing in the intermediate distribution node. This proportional control can be used to reduce transmission power during idle periods, e.g. for G.fast lower operation.

Figure 8:
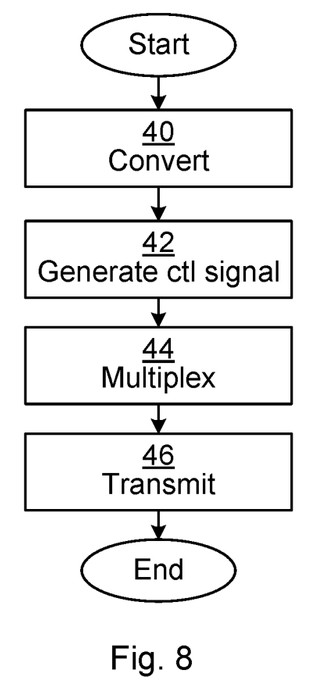
FIG. 8 is a flow chart illustrating a method according to one embodiment, performed in the central node of FIG. 1.

FIG. 8 is a flow chart illustrating a method according to one embodiment, performed in the central node of FIG. 1.

In a convert step 40, incoming digital signals are converted to analogue signals. This is performed in a plurality of converter devices, for each one of a plurality of subscriber devices. As explained above, each converter device comprises an A/D converter and a D/A converter.

In a generate control signal step 42 an analogue control signal is generated for controlling time division duplex at the intermediate distribution node. As explained above, amplitude modulation of the analogue control signal can be used to control the time division duplex at the intermediate distribution node. For example, the analogue control signal can periods of essentially zero amplitude (see 50b and 50d of FIGS. 6-7) or a preconfigured non-zero amplitude (see 50a and 50c of FIGS. 6-7) of the analogue control signal to control the time division duplex at the intermediate distribution node. In one embodiment, the gain of a power amplifier at the intermediate distribution node is proportionally controlled using the amplitude of the analogue control signal.

In a multiplex step 44, the analogue downstream signals and the analogue control signal are multiplexed to a combined analogue signal. The multiplexing can use FDM.

In a transmit step 46, the combined analogue signal is transmitted to the intermediate distribution node over an analogue optical interface.

Figure 9:
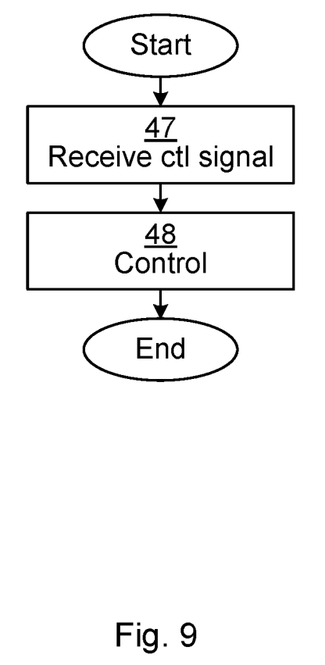
FIG. 9 is a flow chart illustrating a method according to one embodiment, performed in the intermediate distribution node of FIG. 1.

FIG. 9 is a flow chart illustrating a method according to one embodiment, performed in the intermediate distribution node of FIG. 1.

In a receive control signal step 47, an analogue control signal is received from a central node for DSLAM using an analogue optical interface for communication of analogue signals for all of the subscriber devices with the central node.

In a control step 48, the state of a switch for each one of the subscriber devices is controlled to selectively enable reception and/or transmission over a respective subscriber interface, based on the analogue control signal.

In one embodiment, a gain of a transmission amplifier is controlled in proportion to an amplitude of the analogue control signal.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A central node for digital subscriber line access multiplex, the central node connected to an intermediate distribution node and supporting a plurality of subscriber devices, the central node comprising:
   a digital interface for upstream communication;
   a plurality of converter devices, wherein each one of the plurality of converter devices is for each one of the plurality of subscriber devices, wherein each converter device comprises an analogue to digital (A/D) converter and a digital to analogue (D/A) converter;
   an analogue optical interface for communication of analogue signals for all of the plurality of subscriber devices with the intermediate distribution node for digital subscriber line access multiplex;
   a digital multiplexer/demultiplexer connected between the digital interface and the plurality converter devices;
   an analogue multiplexer/demultiplexer connected between the analogue optical interface and the plurality of converter devices; and
   a control signal generator connected to the analogue multiplexer/demultiplexer, wherein the control signal generator is arranged to generate an analogue control signal for controlling time division duplex operation at the intermediate distribution node.

2. The central node according to claim 1, wherein the analogue multiplexer/demultiplexer is arranged to utilize frequency division multiplex over the analogue optical interface.

3. The central node according to claim 1, wherein the control signal generator is arranged to control the time division duplex operation at the intermediate distribution node using amplitude modulation of the analogue control signal.

4. The central node according to claim 3, wherein the control signal generator is arranged to control the time division duplex operation at the intermediate distribution node by selectively providing essentially zero amplitude or a preconfigured non-zero amplitude of the analogue control signal.

5. The central node according to claim 4, wherein the essentially zero amplitude indicates a receiving time slot and the preconfigured non-zero amplitude indicates a transmission time slot.

6. The central node according to claim 3, wherein the control signal generator is further arranged to proportionally control a gain of a power amplifier at the intermediate distribution node using an amplitude of the analogue control signal.

7. The central node according to claim 1, wherein the control signal generator is further arranged to generate a frequency reference signal.

8. An intermediate distribution node for digital subscriber line access multiplex, the intermediate distribution node connected to a central node and supporting a plurality of subscriber devices, the intermediate distribution node comprising:
   an analogue optical interface for communication of analogue signals for all of the plurality of subscriber devices with the central node for digital subscriber line access multiplex;
   a plurality of subscriber interfaces for an electrical subscriber line connection to each one of the plurality of subscriber devices;
   an analogue demultiplexer/multiplexer connected between the analogue optical interface and the plurality of subscriber interfaces; and
   a plurality of switches, wherein each one of the plurality of switches is for each one of the plurality of subscriber devices, wherein each switch is controllable to selectively enable at least one of reception and transmission over the respective subscriber interface, controlled using an analogue control signal received from the central node.

9. The intermediate distribution node according to claim 8, further comprising a transmission amplifier, wherein a gain of the transmission amplifier is proportionally controlled using the analogue control signal.

10. The intermediate distribution node according to claim 8, further comprising a mixer, and a local oscillator, wherein a frequency of the local oscillator depends on a frequency reference signal of the analogue control signal.

11. A method implemented by a central node for controlling an intermediate distribution node for digital subscriber line access multiplex and supporting a plurality of subscriber devices, wherein the method comprising steps of:
   converting incoming digital signals to analogue signals in a plurality of converter devices for each one of a plurality of subscriber devices, wherein each converter device comprises an analogue to digital (A/D) converter and a digital to analogue (D/A) converter;

generating an analogue control signal for controlling time division duplex operation at the intermediate distribution node;

multiplexing the analogue signals and the analogue control signal to a combined analogue signal; and transmitting the combined analogue signal to the intermediate distribution node over an analogue optical interface.

12. The method according to claim 11, wherein the multiplexing comprises multiplexing using frequency division multiplex.

13. The method according to claim 11, wherein the generating the analogue control signal comprises using amplitude modulation of the analogue control signal to control the time division duplex operation at the intermediate distribution node.

14. The method according to claim 13, wherein the generating the analogue control signal comprises selectively providing essentially zero amplitude or a preconfigured non-zero amplitude of the analogue control signal to control the time division duplex operation at the intermediate distribution node.

15. The method according to claim 11, wherein the generating the analogue signal comprises proportionally controlling a gain of a power amplifier at the intermediate distribution node using an amplitude of the analogue control signal.

16. The method according to claim 11, wherein the generating the analogue control signal comprises generating a frequency reference signal.

17. A method performed in an intermediate distribution node for digital subscriber line access multiplex, the intermediate distribution node connected to a central node and supporting a plurality of subscriber devices, the method comprising steps of:

receiving an analogue control signal from a central node for the digital subscriber line access multiplex using an analogue optical interface for communication of analogue signals for all of the plurality of subscriber devices with the central node; and controlling, for each one of the plurality of subscriber devices, a state of a switch, to selectively enable at least one of reception and transmission over a respective subscriber interface, based on the analogue control signal.

18. The method according to claim 17, further comprising the step of:

controlling, for each one of the subscriber devices, a gain of a transmission amplifier, in proportion to an amplitude of the analogue control signal.

19. The central node according to claim 1, further comprising a network processor connected between the digital interface and the digital multiplexer/demultiplexer.

20. The intermediate distribution node according to claim 8, further comprising:

a plurality of line devices, wherein each one of the plurality of line devices is for each one of the plurality of subscriber devices, wherein each one of the plurality of line devices comprises each one of the plurality of switches, and wherein the plurality of line devices are connected to the plurality of subscriber interfaces and the analogue demultiplexer/multiplexer; and a control signal interface having a first interface and a second interface, where the first interface is connected to the analogue optical interface and the second interface is connected to the plurality of line devices.

21. The method according to claim 11, wherein the central node comprises:

a digital interface for receiving the incoming signals;

a control signal generator for generating the analogue control signal;

an analogue demultiplexer/multiplexer for multiplexing the analogue signals and the analogue control signal to the combined analogue signal;

a digital multiplexer/demultiplexer connected between the digital interface and the plurality converter devices;

the analogue multiplexer/demultiplexer connected between the analogue optical interface and the plurality of converter devices; and the control signal generator connected to the analogue multiplexer/demultiplexer.

22. The method according to claim 21, wherein the central node further comprises a network processor connected between the digital interface and the digital multiplexer/demultiplexer.

23. The method according to claim 17, wherein the intermediate distribution node comprising:

a plurality of subscriber interfaces for an electrical subscriber line connection to each one of the plurality of subscriber devices;

an analogue demultiplexer/multiplexer connected between the analogue optical interface and the plurality of subscriber interfaces; and a plurality of switches, wherein each one of the plurality of switches is for each one of the plurality of subscriber devices, wherein each switch is controllable to selectively enable at least one of reception and transmission over the respective subscriber interface, controlled using the analogue control signal received from the central node.

24. The method according to claim 23, wherein the intermediate distribution node further comprising:

a plurality of line devices, wherein each one of the plurality of line devices is for each one of the plurality of subscriber devices, wherein each one of the plurality of line devices comprises each one of the plurality of switches, and wherein the plurality of line devices are connected to the plurality of subscriber interfaces and the analogue demultiplexer/multiplexer; and a control signal interface having a first interface and a second interface, where the first interface is connected to the analogue optical interface and the second interface is connected to the plurality of line devices.

* * * * *